United States Patent
Nishimori et al.

(10) Patent No.: US 10,333,606 B2
(45) Date of Patent: Jun. 25, 2019

(54) METHOD FOR ESTIMATING CHANNEL STATE AND CONTROLLING TRANSMISSION/RECEPTION SIGNAL BY MULTIPLE ANTENNA DEVICE, AND MULTIPLE ANTENNA DEVICE USING SAME

(71) Applicant: Samsung Electronics Co., Ltd., Gyeonggi-do (KR)

(72) Inventors: Kentaro Nishimori, Kanagawa (JP); Tsutomu Mitsui, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 15/563,553

(22) PCT Filed: Jan. 6, 2016

(86) PCT No.: PCT/KR2016/000095
§ 371 (c)(1),
(2) Date: Feb. 20, 2018

(87) PCT Pub. No.: WO2016/159495
PCT Pub. Date: Oct. 6, 2016

(65) Prior Publication Data
US 2018/0175922 A1    Jun. 21, 2018

(30) Foreign Application Priority Data

Mar. 31, 2015  (JP) .................................. 2015-074413
Dec. 17, 2015  (KR) ........................ 10-2015-0181075

(51) Int. Cl.
*H04B 7/06*     (2006.01)
*H04L 25/02*    (2006.01)
(Continued)

(52) U.S. Cl.
CPC .......... *H04B 7/0626* (2013.01); *H04B 17/11* (2015.01); *H04B 17/12* (2015.01); *H04L 25/0224* (2013.01)

(58) Field of Classification Search
CPC ...... H04B 7/0626; H04B 17/12; H04B 17/11; H04L 25/0224
See application file for complete search history.

(56) References Cited

U.S. PATENT DOCUMENTS

| 6,735,182 B1 | 5/2004 | Nishimori et al. |
| 6,778,147 B2 | 8/2004 | Sanada et al. |

(Continued)

FOREIGN PATENT DOCUMENTS

| JP | 2000216618 A | 8/2000 |
| JP | 2003-218758 A | 7/2003 |

(Continued)

OTHER PUBLICATIONS

International Search Report dated Apr. 20, 2016 in connection with International Patent Application No. PCT/KR2016/000095.

(Continued)

*Primary Examiner* — Dac V Ha

(57) ABSTRACT

A multi-antenna apparatus for controlling transmission and reception of signals based on channel estimation includes: a signal transmitter configured to transmit a first signal using a multi-antenna; a signal receiver configured to receive a second signal using the multi-antenna based on the transmitted first signal; a signal transferrer configured to receive a third signal received from the signal transmitter and provide the third signal to the signal receiver; and a controller configured to estimate a channel state of the multi-antenna based on the second signal and the third signal obtained from the signal receiver, and control transmission (Continued)

and reception of signals through the multi-antenna according to the estimated channel state.

20 Claims, 13 Drawing Sheets

(51) Int. Cl.
*H04B 17/11* (2015.01)
*H04B 17/12* (2015.01)

(56) References Cited

U.S. PATENT DOCUMENTS

| | | |
|---|---|---|
| 8,289,869 B2 | 10/2012 | Sawai |
| 2004/0085939 A1* | 5/2004 | Wallace ............... H04B 7/0421 370/335 |
| 2010/0190456 A1 | 7/2010 | Asplund et al. |
| 2013/0070871 A1* | 3/2013 | To ..................... H04B 7/0452 375/296 |
| 2013/0235962 A1 | 9/2013 | O'Keefe et al. |
| 2015/0318908 A1* | 11/2015 | Ko ..................... H04L 1/00 375/267 |

FOREIGN PATENT DOCUMENTS

| | | |
|---|---|---|
| JP | 2008092061 A | 4/2008 |
| JP | 2010093704 A | 4/2010 |
| WO | 2010121254 A1 | 10/2010 |
| WO | 2012158078 A1 | 11/2012 |

OTHER PUBLICATIONS

Written Opinion of the International Searching Authority dated Apr. 20, 2016 in connection with International Patent Application No. PCT/KR2016/000095.

Kentaro Nishimori et al., "Automatic Calibration Method Using Transmitting Signals of an Adaptive Array for TDD Systems", IEEE Transactions on Vehicular Technology, vol. 50, No. 6, Nov. 2001, p. 1636-1640.

Office Action dated Mar. 15, 2019 in connection with Japanese Patent Application No. 2015-074413, 9 pages.

* cited by examiner

METHOD FOR ESTIMATING CHANNEL STATE AND CONTROLLING TRANSMISSION/RECEPTION SIGNAL BY MULTIPLE ANTENNA DEVICE, AND MULTIPLE ANTENNA DEVICE USING SAME

CROSS-REFERENCE TO RELATED APPLICATIONS AND CLAIM OF PRIORITY

The present application claims priority under 35 U.S.C. § 365 to International Patent Application No. PCT/KR2016/000095 filed Jan. 6, 2016, entitled "METHOD FOR ESTIMATING CHANNEL STATE AND CONTROLLING TRANSMISSION/RECEPTION SIGNAL BY MULTIPLE ANTENNA DEVICE, AND MULTIPLE ANTENNA DEVICE USING SAME", and through Japanese Patent Application No. 2015-074413, which was filed on Mar. 31, 2015, and Korean Patent Application No. 10-2015-0181075, which was filed on Dec. 17, 2015, each of which are incorporated herein by reference into the present disclosure as if fully set forth herein.

TECHNICAL FIELD

The present invention relates to a method of controlling transmission and reception of signals based on channel estimation in a multi-antenna apparatus.

BACKGROUND

Recently, a multi-antenna system has been attracting attention for achieving high frequency utilization efficiency in a limited frequency band. In order to implement the multi-antenna system, channel state information (CSI) may be required between a base station and a terminal.

Meanwhile, FIG. 8 is a view of an example of a multi-antenna system that obtains CSI by feeding back CSI from a user terminal (UT) to a base station (BS).

Referring to FIG. 8, the base station may include a multi-antenna 201 configured by N antennas 201-1 to 201-N, N transmitters Tx1 to TxN, and N receivers Rx1 to RxN respectively corresponding to the antennas 201-1 to 201-N. Furthermore, the base station may include N circulators 205-1 to 205-N and a controller 206 for respectively connecting transmitters Tx1 to TxN and receivers Rx1 to RxN to the antennas 201-1 to 201-N. Meanwhile, the terminal may include an antenna 101 and a control unit 107.

Referring to FIG. 8, in operation S23, the base station may start communication with the terminal through operation S21 of transmitting a signal for estimating CSI from the base station to the terminal and operation S22 of feeding back the signal for estimating CSI from the terminal to the base station. In addition, in the method of FIG. 8, CSI including information about a difference in amplitude and phase between a transmitter and a receiver may be estimated by feeding back the CSI. The number of times transmission and reception of signals for estimating CSI is performed increases depending on the number of antennas (the number of antenna elements) of the base station. Therefore, if the number of antennas of the base station or the number of users communicating with the base station increases, the amount of CSI feedback increases and communication efficiency may be greatly reduced.

SUMMARY

The present disclosure provides a method of controlling transmission and reception of signals based on channel estimation in a multi-antenna apparatus.

As a technical means to achieve the above-mentioned technical problem, some embodiments of the present disclosure may include, in a multi-antenna apparatus for controlling transmission and reception of signals based on channel estimation, a signal transmitter configured to transmit a first signal using a multi-antenna; a signal receiver configured to receive a second signal using the multi-antenna based on the transmitted first signal; a signal transferrer configured to receive a third signal received from the signal transmitter and provide the third signal to the signal receiver; and a controller configured to estimate a channel state of the multi-antenna based on the second signal and the third signal obtained from the signal receiver, and control transmission and reception of signals through the multi-antenna according to the estimated channel state.

The controller may include a calculator configured to calculate a calibration value of the multi-antenna based on the channel state, and the calibration value may be calculated based on a ratio of a comparison target value determined based on respective transfer functions of the second signal and third signal of a first antenna among the multi-antenna to a comparison target value of a second antenna among the multi-antenna.

The comparison target value may be determined by a ratio of the transfer function of the second signal of the first antenna to the transfer function of the third signal of the first antenna.

The comparison target value may be determined by a ratio of the transfer function of the second signal or the third signal of the first antenna to a transfer function of the third signal or the second signal of the second antenna.

The controller may include a transmission signal processor configured to control amplitude and phase of the first signal input to the signal transmitter based on the channel state.

The signal transmitter may include a variable attenuator configured to correct a power intensity of the multi-antenna using different power intensities for different antennas when transmitting and receiving the signals.

The signal transmitter may include: an oscillator configured to generate an electrical vibration; and a mixer configured to mix an output signal of the variable attenuator and an output signal of the oscillator.

The controller may include: a transmission signal controller configured to distribute a transmission signal to a plurality of transmission signals, to adjust intensities of the plurality of transmission signals, and to transmit the transmission signals to the signal transmitter for transmitting the transmission signal through the multi-antenna; and a reception signal controller configured to adjust intensities of a plurality of reception signals received through the multi-antenna and synthesize the plurality of reception signals into one reception signal.

The first signal may be a downlink pilot signal.

The number of times the second signal is sampled by the calculator may be equal to the number of antennas of the multi-antenna, and the calculator may calculate the calibration value of the multi-antenna by storing the third signal by the number of times the second signal is sampled.

When a calibration value of the first signal is calculated, the calculator may calculate a calibration value of the second signal by using the second signal received at an arbitrary time.

Furthermore, some embodiments of the present disclosure may include, in a method of controlling transmission and reception of signals based on channel estimation in a multi-antenna apparatus, transmitting a first signal from a signal transmitter; transferring a third signal received from the signal transmitter to a signal receiver; receiving a second signal using the multi-antenna based on the transmitted first signal; and estimating a channel state of the multi-antenna based on the received second signal and the transferred third signal, and controlling transmission and reception of signals through the multi-antenna according to the estimated channel state.

The method may further include calculating a calibration value of the multi-antenna based on the estimated channel state of the multi-antenna, and wherein the calibration value may be defined as a ratio of a comparison target value determined based on respective transfer functions of the second signal and the third signal of a first antenna among the multi-antenna to a comparison target value of a second antenna among the multi-antenna.

The comparison target value may be a ratio of a transfer function of the second signal of the first antenna to a transfer function of the third signal of the first antenna.

The comparison target value may be a ratio of the transfer function of the second signal or the third signal of the first antenna to a transfer function of the third signal or the second signal of the second antenna.

The method may further include controlling amplitude and phase of the first signal based on the estimated channel state.

The transferring of the third signal to the signal receiver may include correcting a power intensity of the multi-antenna using different power intensities for different antennas when transmitting and receiving the third signal.

The number of times the second signal is sampled may be equal to the number of antennas of the multi-antenna, and the method may include calculating the calibration value of the multi-antenna by storing the third signal by the number of times the second signal is sampled.

When a calibration value of the first signal is calculated, a calibration value of the second signal may be calculated by using the second signal received at an arbitrary time.

Furthermore, in some embodiments of the present disclosure, a non-transitory computer-readable recording medium has recorded thereon a program for executing the method of controlling transmission and reception of signals based on channel estimation in a multi-antenna apparatus.

As described above, a multi-antenna apparatus may control transmission and reception of signals by estimating a channel state without an external device, and thus communication efficiency can be increased without depending on the installation position and the surrounding environment.

DETAILED DESCRIPTION

Figure 1:
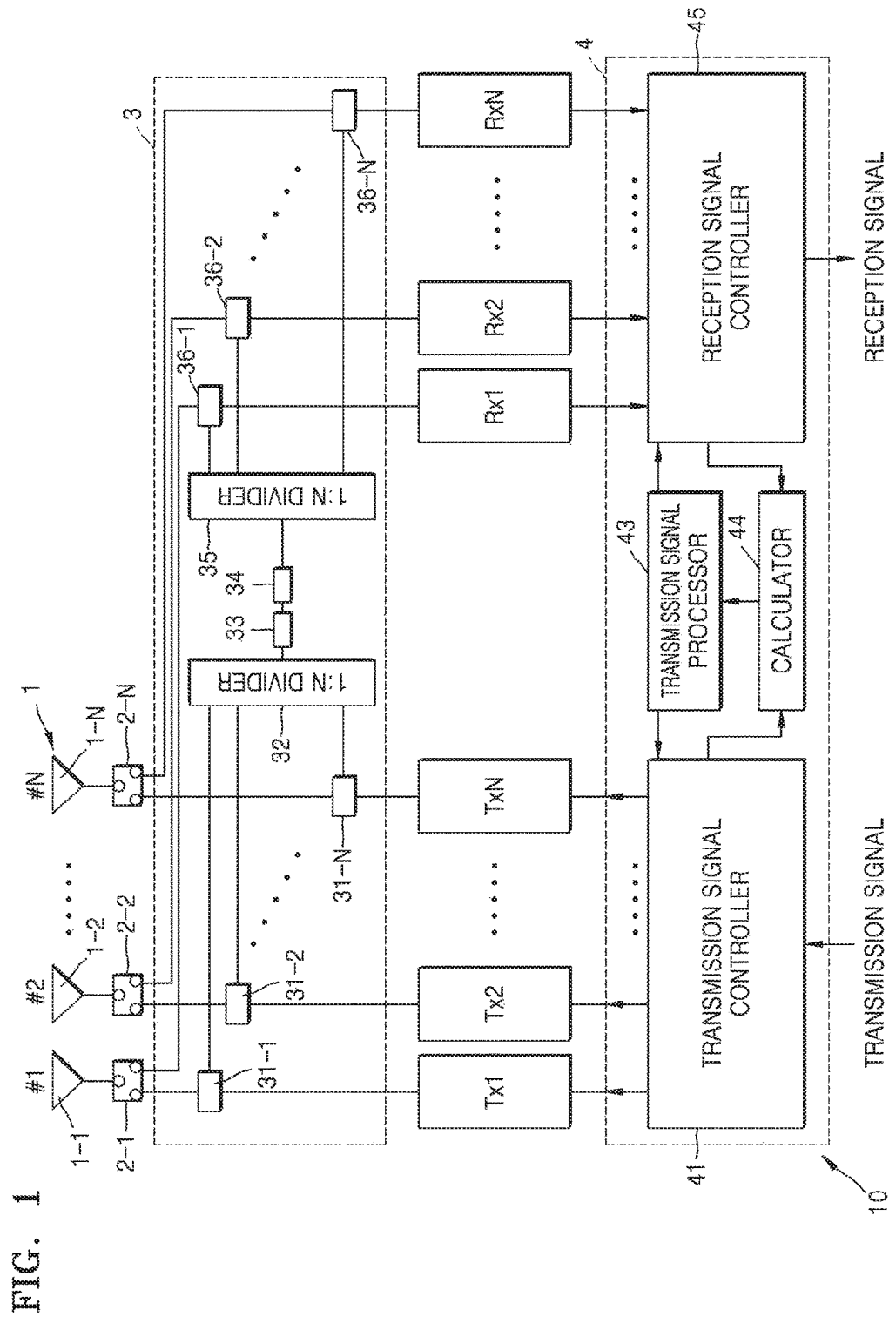
FIG. 1 is a view of a multi-antenna apparatus of a time division duplex (TDD) system for controlling transmission and reception of signals based on channel estimation, according to some embodiments of the present disclosure.

A multi-antenna apparatus for controlling transmission and reception of signals based on channel estimation, according to some embodiments of the present disclosure, may include a signal transmitter configured to transmit a first signal using a multi-antenna, a signal receiver configured to receive a second signal using the multi-antenna based on the transmitted first signal, a signal transferrer configured to receive a third signal received from the signal transmitter and provide the third signal to the signal receiver, and a controller configured to estimate a channel state of the multi-antenna based on the second signal and the third signal obtained from the signal receiver, and control transmission and reception of signals through the multi-antenna according to the estimated channel state.

General and widely used terms have been employed herein, in consideration of functions provided in the disclosure, and may vary according to an intention of one of ordinary skill in the art, a precedent, or emergence of new technologies. Additionally, in some cases, an applicant may arbitrarily select specific terms, in which case, the applicant will provide the meaning of the terms in the description of the embodiments. Accordingly, It will be understood that the terms used herein should be interpreted as having a meaning that is consistent with their meaning in the context of the relevant art and will not be interpreted in an idealized or overly formal sense unless expressly so defined herein.

Throughout the specification, it will be understood that when a unit is referred to as being "connected" to another element, it may be "directly connected" to the other element or "electrically connected" to the other element in a state in which intervening elements are present. In addition, it will be understood that when a unit is referred to as "comprising"

another element, it may not exclude the other element but may further include the other element unless specifically oppositely indicates. In addition, terms such as " . . . unit", " . . . module", or the like refer to units that perform at least one function or operation, and the units may be implemented as hardware or software or as a combination of hardware and software. It will be understood that, although the terms first, second, etc. may be used herein to describe various elements, these elements should not be limited by these terms. These terms are only used to distinguish one element from another.

Throughout the specification, a "terminal" may refer to a personal computer (PC), a mobile phone, a smart phone, a TV, a tablet PC, a laptop computer, a personal digital assistant (PDA), a portable multimedia player (PMP), a navigation device, an MP3 player, or a digital camera. However, the present invention is not limited thereto.

In the present disclosure, an apparatus including a multi-antenna may refer to an apparatus including two or more antennas (or antenna elements). For example, a multi-antenna apparatus may be, but is not limited to, a base station. Further, a multi-antenna system may refer to a system including at least one multi-antenna apparatus.

Hereinafter, the present invention will be described in detail with reference to the accompanying drawings.

Figure 9:
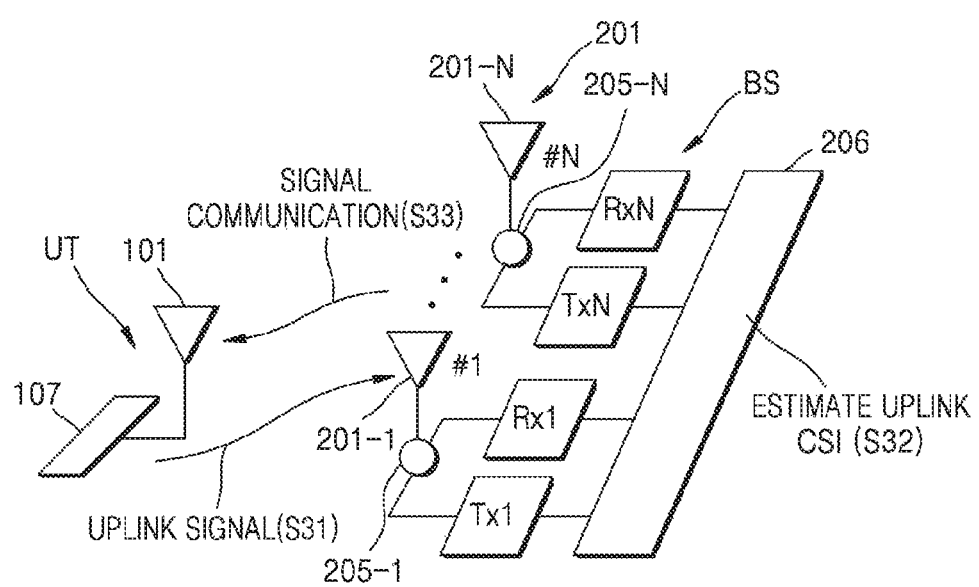
FIG. 9 is a view of an example of a multi-antenna system that does not feed back channel state information.

FIG. 9 is a view of an example of a multi-antenna system that does not feed back channel state information (CSI).

Figure 8:
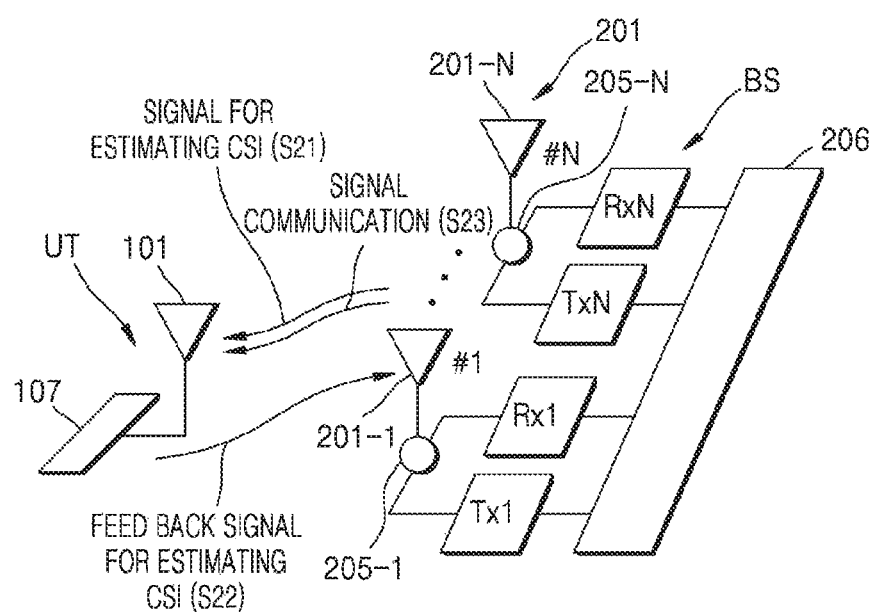
FIG. 8 is a view of an example of a multi-antenna system that obtains channel state information by feeding back channel state information from a terminal to a base station.

In FIG. 9, the same reference numerals as in FIG. 8 denote the same elements, and descriptions thereof will not be given herein. In the multi-antenna system that does not feed back CSI of FIG. 9, in operation S31, a predetermined uplink signal is transmitted from a terminal UT to a base station BS, and in operation S32, uplink CSI is estimated according to the signal transmitted to the base station BT. In operation S33, communication starts between the base station BS and the terminal UT. Referring to FIG. 9, since only a control signal for estimating CSI is transmitted from the terminal UT to the base station BS, communication efficiency does not depend on the number of antenna elements of the base station BS. In addition, CSI feedback is unnecessary, so that communication efficiency may be improved as compared with the method shown in FIG. 8. However, the multi-antenna system of FIG. 9 has to calculate a calibration value to correct a difference in amplitude and phase between transfer functions $T_k$ and $R_k$ of a transceiver provided in the base station BS.

The calibration value indicates a value used for correcting a difference in phase and amplitude between branches, i.e., correcting phase and amplitude of a branch based on the other branch. For example, the calibration value in FIG. 9 may be obtained as a ratio between branches of $T_k/R_k$ according to a transfer function of each transceiver. Where, $T_k$ is a transfer function of a $k^{th}$ transmitter Txk, and $R_k$ is a transfer function of a $k^{th}$ receiver Rxk. K=1 to N, and N indicates the number of elements of a multi-antenna. Furthermore, each of the transfer functions $T_k$ and $R_k$ is complex amplitude and includes a phase component and an amplitude component. For example, a calibration value of a transceiver #2 having a transceiver #1 as a reference may be defined as $T_2/R_2$ divided by $T_1/R_1$. Also, a comparison target value ($T_k/R_k$ in this example) when a calibration value is obtained is referred to as a comparison target value.

Meanwhile, an embodiment for implementing a correction according to a calibration value may include a method in which the base station BS and the terminal UT obtain CSI in both directions in advance before starting communication and use the difference as a calibration value. However, according to the method, the calibration value may not be stably obtained when the terminal UT moves or when the terminal UT is outdoors and a propagation environment changes.

Another example of performing a correction using a calibration value may include a method of obtaining a calibration value using two loops (Loop A and Loop B) in order to feed back a portion of a transmission signal to a receiving side in the base station BS.

Figure 10:
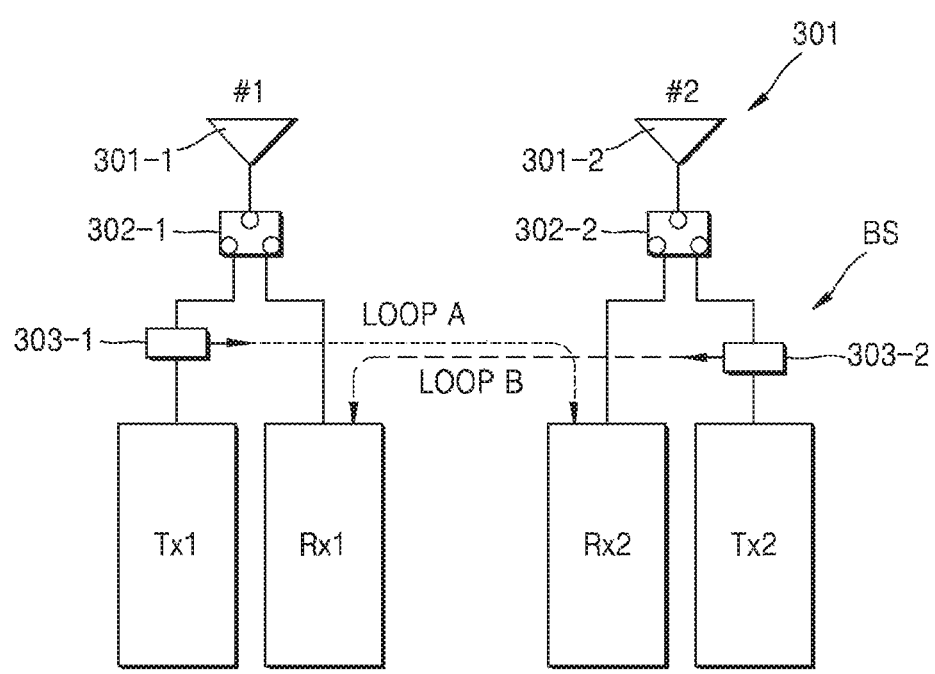
FIG. 10 is a view of an example of a multi-antenna apparatus using two loops to feed back channel state information.

FIG. 10 is a view of an example of a multi-antenna apparatus using two loops to feed back CSI.

Referring to FIG. 10, since an external device is not used, a calibration value may be obtained without depending on a place where the base station BS is installed or a surrounding environment.

In the configuration of FIG. 10, the base station BS includes a multi-antenna apparatus 301 having at least two antenna elements 301-1 and 301-2, and a transmitter Tx1 and a receiver Rx1 and a transmitter Tx2 and a receiver Rx2 respectively corresponding to the antenna element 301-1 and the antenna element 301-2. Furthermore, the base station BS includes time division duplex (TDD) switches 302-1 and 302-2 which selectively connect the transmitter Tx1 or receiver Rx1 or the transmitter Tx2 or receiver Rx2 to the antenna element 301-1 or 301-2. The base station BS further includes a directional coupler 303-1 for feeding back a portion of a transmission signal of the transmitter Tx1 to the receiver Rx2 and a directional coupler 303-2 for feeding back a portion of a transmission signal of the transmitter Tx2 to the receiver Rx1. In the configuration of FIG. 10, a loop that feeds back a portion of the transmission signal of the transmitter Tx1 to the receiver Rx2 using a distributor or the like (not shown) is Loop A. Furthermore, a loop that feeds back a portion of the transmission signal of the transmitter Tx2 to the receiver Rx1 is Loop B.

Meanwhile, in the configuration of FIG. 10, a transfer function LA of Loop A and a transfer function LB of Loop B may be represented as follows when a calibration value is obtained as a ratio of the value $T_k/R_k$ corresponding to each transceiver.

$$L_A = T_1 R_2$$

$$L_B = T_2 R_1 \quad \text{[Formula 1]}$$

Here, $T_1$ and $T_2$ are transfer functions of the transmitters Tx1 and Tx2, and $R_1$ and $R_2$ are transfer functions of the receivers Rx1 and Rx2.

A relationship between the transfer function LA and the transfer function LB and a calibration value $D_{2,1}$ of the transceiver #2 having the transceiver #1 as a reference may be represented as follows.

[Formula 2]

$$D_{2,1} = \frac{L_B}{L_A} = \frac{T_2 R_1}{T_1 R_2} = \frac{T_2/R_2}{T_1/R_1}$$

Formula 2 represents that a value obtained by dividing a value $T_2/R_2$ to be compared to the transceiver #2 (a combination of the transmitter Tx2 and the receiver Rx2) by a value $T_1/R_1$ to be compared to the transceiver #1 (a combination of the transmitter Tx1 and the receiver Rx1) becomes the calibration value $D_{2,1}$ of the transceiver #2 having the transceiver #1 as a reference.

Figure 11:
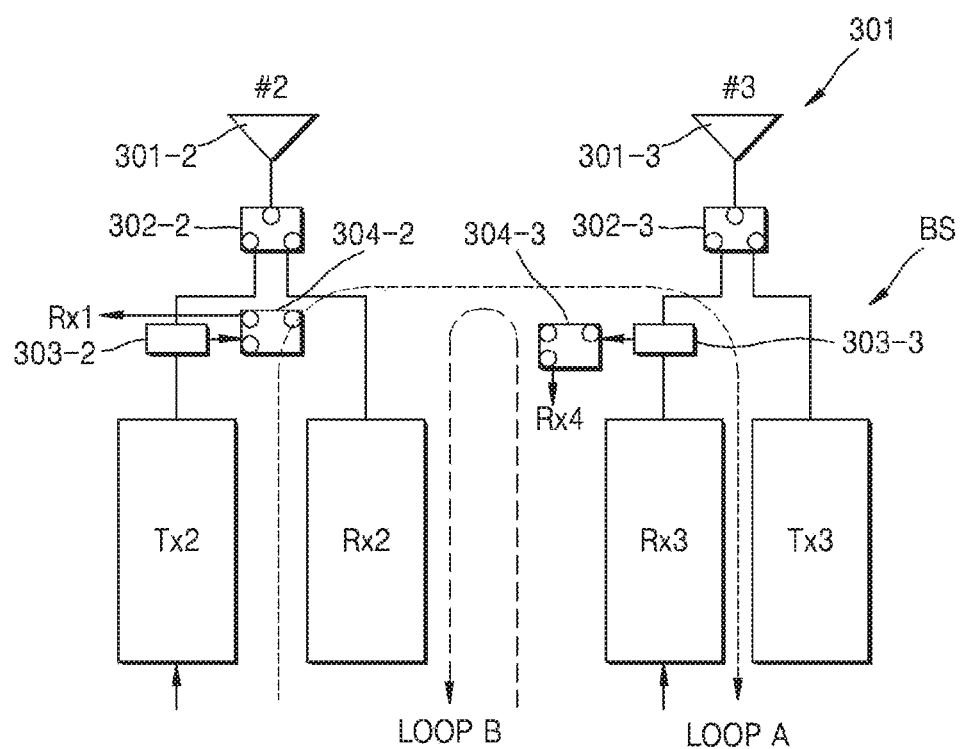
FIG. 11 is a view of another example of a multi-antenna apparatus using two loops to feed back channel state information.

Meanwhile, a multi-antenna apparatus of FIG. 11 may prevent the configuration from being complicated when the number N of antenna elements of the base station BS increases.

FIG. 11 is a view of another example of a multi-antenna apparatus using two loops to feed back CSI.

Referring to FIG. 11, a plurality of loops including Loop A and Loop B are formed to obtain a comparison target value between adjacent elements. In the configuration of FIG. 11, switches 304-2 and 304-3 provided to obtain a comparison target value between adjacent elements may be realized by only a two-branch switch.

The base station BS also includes the multi-antenna apparatus 301 having a plurality of antenna elements such as antenna elements 301-2 and 301-3, and a plurality of the transmitter Tx2 and receiver Rx2, and a transmitter Tx3 and a receiver Rx3 respectively corresponding to the antenna elements 301-2 and 301-3. The base station BS also includes the TDD switch 302-2 for selectively connecting the transmitter Tx2 or the receiver Rx2 to the antenna element 301-2, and a TDD switch 302-3 for selectively connecting the transmitter Tx3 or the receiver Rx3 to the antenna element 301-3. The base station BS further includes the switch 304-2 for feeding back a portion of the transmission signal of the transmitter Tx1 to the receiver Rx3 or Rx1, and the switch 304-3 for feeding back a portion of a transmission signal of the transmitter Tx3 to the receiver Rx2 or a receiver Rx4. In the configuration of FIG. 11, a loop that feeds back a portion of the transmission signal of the transmitter Tx2 to the receiver Rx3 is Loop A. Furthermore, a loop that feeds back a portion of the transmission signal of the transmitter Tx3 to the receiver Rx2 is Loop B.

If $T_k$ is the transfer function of the $k^{th}$ transmitter Txk and $R_k$ is the transfer function of the $k^{th}$ receiver Rxk, a transfer function of Loop A may be represented by $T_2R_3$ and a transfer function of Loop B by $T_3R_2$.

A calibration value $D_{3,2}$ of a transceiver #3 having the transceiver #2 as a reference may be represented by the following Equation.

[Formula 3]

$$D_{3,2} = \frac{T_3 R_2}{T_2 R_3}$$

Furthermore, a calibration value $D_{3,1}$ of the transceiver #3 having the transceiver #1 as a reference may be obtained from the calibration value $D_{3,2}$ of the transceiver #3 based on the transceiver #2, and the calibration value $D_{2,1}$ of the transceiver #2 having the transceiver #1 as a reference through Formula 4.

[Formula 4]

$$\begin{aligned} D_{3,1} &= D_{3,2} \cdot D_{2,1} \\ &= \frac{T_3 R_2}{T_2 R_3} \cdot \frac{T_2 R_2}{T_1 R_2} \\ &= \frac{T_3 R_1}{T_1 R_3} \end{aligned}$$

That is, since the multi-antenna of FIGS. 10 and 11 do not use an external device, a comparison target value may be obtained without depending on a place where the multi-antenna is installed or a surrounding environment.

However, since the multi-antenna 301 of FIGS. 10 and 11 have the transmitter Tx1 and the receiver Rx1 as references, a plurality of calibration procedures are required. In particular, in the multi-antenna apparatus 310 of FIG. 10, when a comparison target value is calculated from adjacent elements, a value including an error is accumulated when the error occurs in a transmitter or a receiver, thereby causing a problem.

Furthermore, when power of a transmission signal transmitted from the transmitter Tx is different from power of a reception signal obtained by the receiver Rx, it is necessary to perform calibration between the transmitter and the receiver using power output from the transmitter Tx. However, the multi-antenna apparatus 310 of FIGS. 10 and 11 have no countermeasure when power of the transmission signal is different from power of the reception signal.

Similarly, when forming a transmission radiation pattern with a multi-antenna using CSI, different powers are applied to respective antennas. If different powers are applied to respective antennas, it is necessary to perform calibration between the transmitter and the receiver using different powers. However, the multi-antenna apparatus 310 of FIGS. 10 and 11 have no countermeasure thereto.

In addition, in the multi-antenna apparatus 310 of FIGS. 10 and 11, a guarantee of transmission/reception isolation and a countermeasure when calibration is not performed have not been examined.

FIG. 1 is a view of a multi-antenna apparatus 10 of a time division duplex (TDD) system for controlling transmission and reception of signals based on channel estimation, according to some embodiments of the present disclosure.

Referring to FIG. 1, the multi-antenna apparatus 10 may perform communication according to the TDD system. That is, the multi-antenna apparatus 10 may transmit and receive signals by the TDD system using an identical frequency. The multi-antenna apparatus 10 may further include a multi-antenna 1, N TDD switches 2-1 to 2-N, a signal transferrer 3, a signal transmitter including N transmitters Tx1 to TxN, a signal receiver including N receivers Rx1 to RxN, and a controller 4. The signal transferrer 3 may include N directional couplers 31-1 to 31-N, a 1:N divider (a synthesizer of N-input and 1-output) 32, a variable attenuator 33, an ON/OFF switch 34, a 1:N divider (a distributor of 1-input and N-output) 35, and N dividers 36-1 to 36-N. Furthermore, the controller 4 may include a transmission signal controller 41, a transmission signal processor 43, a calculator 44, and a reception signal controller 45.

The multi-antenna 1 has at least two N antenna elements 1-1 to 1-N arranged in a predetermined order. The TDD switches 2-1 to 2-N are provided corresponding to the antenna elements 1-1 to 1-N, respectively. The TDD switches 2-1 to 2-N are connected to the transmitters Tx1 to TxN or the receivers Rx1 to RxN through the directional couplers 31-1 to 31-N or dividers 36-1 to 36-N by time division, with respect to the antenna elements 1-1 to 1-N.

The directional couplers 31-1 to 31-N receive signals output from the transmitters Tx1 to TxN and respectively output a portion of the signals to N inputs of the divider 32, and then output the remaining signals to input terminals of the TDD switches 2-1 to 2-N, respectively. The dividers 36-1 to 36-N are connected to output terminals of the switches 2-1 to 2-N and output terminals of the divider 35, respectively. The dividers 36-1 to 36-N synthesize output signals of the antenna elements 1-1 to 1-N received through the switches 2-1 to 2-N and N output signals of the divider 35, and output them to the receivers Rx1 to RxN, respectively.

The variable attenuator 33 and the ON/OFF switch 34 form a series circuit and connect the divider 32 and the divider 35. The variable attenuator 33 is an attenuator capable of changing attenuation, and the attenuation is controlled by the controller 4. When the ON/OFF switch 34 is turned ON, the divider 32 and the divider 35 are connected to each other. When the ON/OFF switch 34 is turned OFF, the divider 32 and the divider 35 are isolated from each other.

The transmitters Tx1 to TxN amplify input signals received from the controller 4 and input them to the corresponding antenna elements 1-1 to 1-N. N signals output from the transmission signal controller 41 are input to the transmitters Tx1 to TxN, respectively. Furthermore, the N signals output from the transmission signal controller 41 may be a result of scaling weight coefficients of a complex number, according to an instruction from the transmission signal processor 43.

The receivers Rx1 to RxN amplify respective output signals of the corresponding antenna elements 1-1 to 1-N and input them to the controller 4. The signals output from the receivers Rx1 to RxN are input to N inputs of the reception signal controller 45, respectively. The reception signal controller 45 scales the weight coefficients of the complex number for the N signals input from the receivers Rx1 to RxN, and synthesizes the scaling result into one reception signal, and outputs the one reception signal according to the instruction from the transmission signal processor 43

The transmission signal processor 43 controls a radiation pattern of the multi-antenna 1 by weighting amplitudes and phases to signals respectively input to the plurality of transmitters Tx1 to TxN. The transmission signal processor 43 controls the radiation pattern of the multi-antenna 1 by weighting amplitudes and phases to signals respectively output from the plurality of receivers Rx1 to RxN. Here, the transmission signal processor 43 calibrates weight coefficients of amplitudes and phases according to a calibration value of each branch calculated by the calculator 44.

The calculator 44 calculates a calibration value of amplitudes and phases of a branch of each of the antenna elements 1-1 to 1-N according to each reception signal obtained by the N receivers Rx1 to RxN through two dividers 32 and 25. The calculator 44 receives a predetermined signal output from the transmission signal controller 41 and receives each reception signal input to the reception signal controller 45. Then, the calculator 44 outputs the calibration value calculated for each branch according to the reception signals.

Next, some embodiments of calculating a calibration value in the multi-antenna apparatus 10 will be described with reference to FIGS. 2 to 4.

Figure 2:
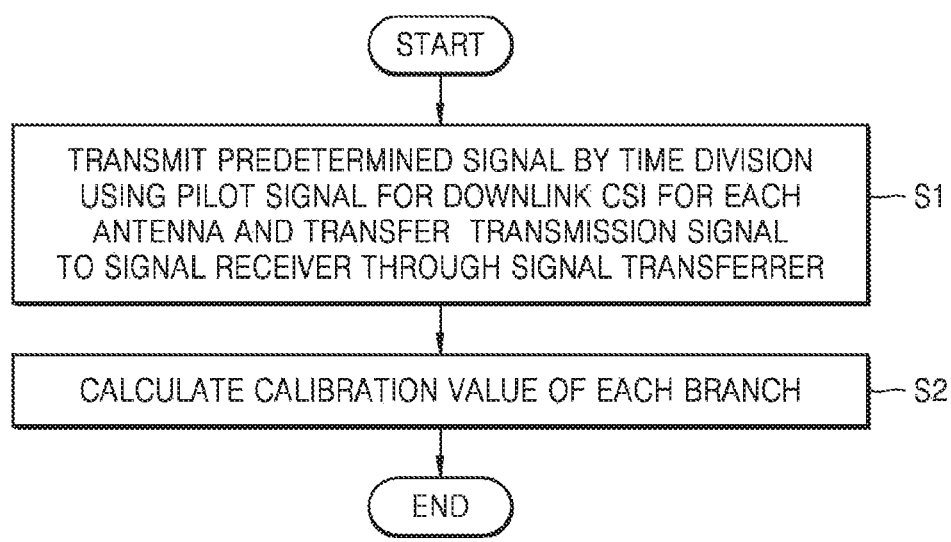
FIG. 2 is a flowchart of a method of controlling transmission and reception of signals based on channel estimation in a multi-antenna apparatus, according to some embodiments of the present disclosure.

FIG. 2 is a flowchart of a method of controlling transmission and reception of signals based on channel estimation in the multi-antenna apparatus 10, according to some embodiments of the present disclosure.

Referring to FIG. 2, when calculating the calibration value, the multi-antenna apparatus 10 may use a transmission period of a pilot signal for downlink CSI for each antenna element. In operation S1, it is also possible to transmit a predetermined signal from each of the transmitters Tx1 to TxN by time division and to receive a transmission signal by each of the receivers Rx1 to RxN included in a signal receiver through the signal transferrer 3. A method of using an antenna will be described in detail with reference to FIG. 3.

Figure 3:
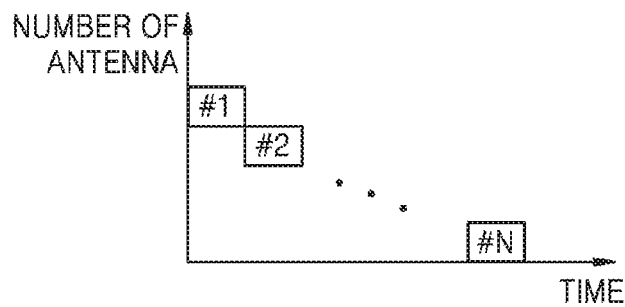
FIG. 3 is a view for explaining a method of using an antenna over time according to some embodiments of the present disclosure.

FIG. 3 is a view for explaining a method of using an antenna over time according to some embodiments of the present disclosure. Referring to FIG. 3, each of the transmitters Tx1 to TxN in the multi-antenna apparatus 10 of FIG. 2 may transmit a predetermined pilot signal by time division.

Meanwhile, referring to FIG. 2, in operation S2, the calculator 44 may calculate a predetermined comparison target value according to the signal transmitted from each of the transmitters Tx1 to TxN and the signal received by each of the receivers Rx1 to RxN, and may obtain a calibration value of each branch according to the comparison target value. Operation S2 may be performed within a period T2 of a data signal shown in FIG. 4.

Figure 4:
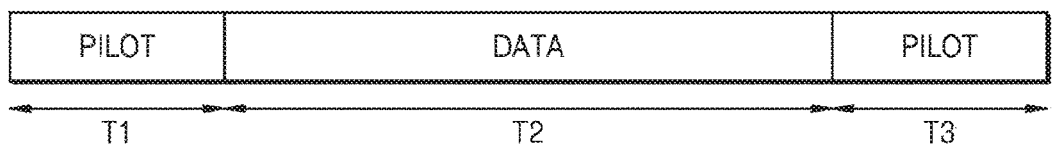
FIG. 4 is a view for explaining a signal transmitted by a transmitter of a multi-antenna apparatus, according to some embodiments of the present disclosure.

FIG. 4 is a view for explaining a signal transmitted by a transmitter of a multi-antenna apparatus, according to some embodiments of the present disclosure.

Referring to FIG. 4, transmission periods T1 and T3 are periods during which a pilot signal Pilot is transmitted, and a transmission period T2 is a period during which transmission data Data is transmitted. If the transmission of the pilot signal cannot be completed within the number of times N, which is equal to the number of antenna elements, within the transmission period T1 of the pilot signal shown in FIG. 4 by the TDD system, the transmission of the pilot signal may be performed using the transmission period T3 of the pilot signal Pilot next to the transmission data of transmission period T2 and may be divided into the period T1 and the period T3.

Meanwhile, if a pilot signal transmitted from each of the transmitters Tx1 to TxN in the multi-antenna apparatus 10 of FIG. 2 is s(t), a reception signal $x_{k1}$ which is received by the receiver Rxk from the transmitter Tx1 . . . , a reception signal $x_{kN}$ which is received by the receiver Rxk from the transmitter TxN may be represented by Equations (1-1) to (1-N) using the transfer functions $T_1$ to $T_N$ and $R_k$, as shown in Formula 5. Here, t denotes time.

[Formula 5]

$$x_{k1} = T_1 R_k s(t) \qquad (1\text{-}1)$$

$$x_{k2} = T_2 R_k s(t) \qquad (1\text{-}2)$$

$$\vdots$$

$$x_{kN} = T_N R_k s(t) \qquad (1\text{-}N)$$

Referring to Formula 5, a comparison target value may be $T_k/R_k$ according to a transfer function of each transceiver. Where $T_k$ is a transfer function of the $k^{th}$ transmitter Txk, and $R_k$ is a transfer function of the $k^{th}$ receiver Rxk. Where k=1 to N, and N denotes the number of elements of a multi-antenna. Furthermore, each of the transfer functions $T_k$ and $R_k$ is a complex amplitude, and is a complex number including a phase component and an amplitude component. The transfer function $T_k$ of the transmitter Txk is a transfer function from the transmitter Txk to the divider 32, and the transfer function $R_k$ of the receiver Rxk is a transfer function from the divider 35 to the receiver Rxk.

If k=2 for Equation (1-1) and k=1 for Equation (1-2), Equations (1-1) and (1-2) are represented by Equations (2-1) and (2-2) as shown in Formula 6.

[Formula 6]

$$x_{21} = T_1 R_2 s(t) \qquad (2\text{-}1)$$

$$x_{12} = T_2 R_1 s(t) \qquad (2\text{-}2)$$

Where dividing Equation (2-2) by Equation (2-1) yields Equation (3) as shown in Formula 7. Equation (3) represents a calibration value of the transceiver #2 having the transceiver #1 as a reference.

[Formula 7]

$$\frac{x_{12}}{x_{21}} = \frac{T_2 R_1 s(t)}{T_1 R_2 s(t)} = \frac{T_2/R_2}{T_1/R_1} \quad (3)$$

Similarly, a calibration value of a transceiver #k having the transceiver #1 as a reference may be represented as below.

[Formula 8]

$$\frac{x_{1k}}{x_{k1}} = \frac{T_k R_1 s(t)}{T_1 R_k s(t)} = \frac{T_k/R_k}{T_1/R_1} \quad (4)$$
$$(k = 2 \sim N)$$

That is, when the multi-antenna apparatus 10 of FIG. 1 feeds back a transmission signal to a receiving side, the multi-antenna apparatus 10 may transmit the signal using the divider 32 without selecting a corresponding receiver by a switch. Furthermore, since the multi-antenna apparatus 10 may include the divider 35 in front of the receiving side, the multi-antenna apparatus 10 may simultaneously obtain transfer functions of all combinations of a transmitter and a receiver.

The multi-antenna apparatus 10 of FIG. 1 may also include the variable attenuator 33 and the ON/OFF switch 34 between the dividers 32 and 35. The variable attenuator 33 is provided for calibration between transceivers that operate at different powers. Therefore, even if a transmitter operates at relatively high power, it is possible to prevent the receiver Rxk from receiving a signal that becomes saturated by increasing attenuation of the variable attenuator 33.

Furthermore, the ON/OFF switch 34 may be set to OFF when calibration is not necessary, so that the ON/OFF switch 34 may be used to ensure isolation between a transmitter and a receiver.

Figure 5:
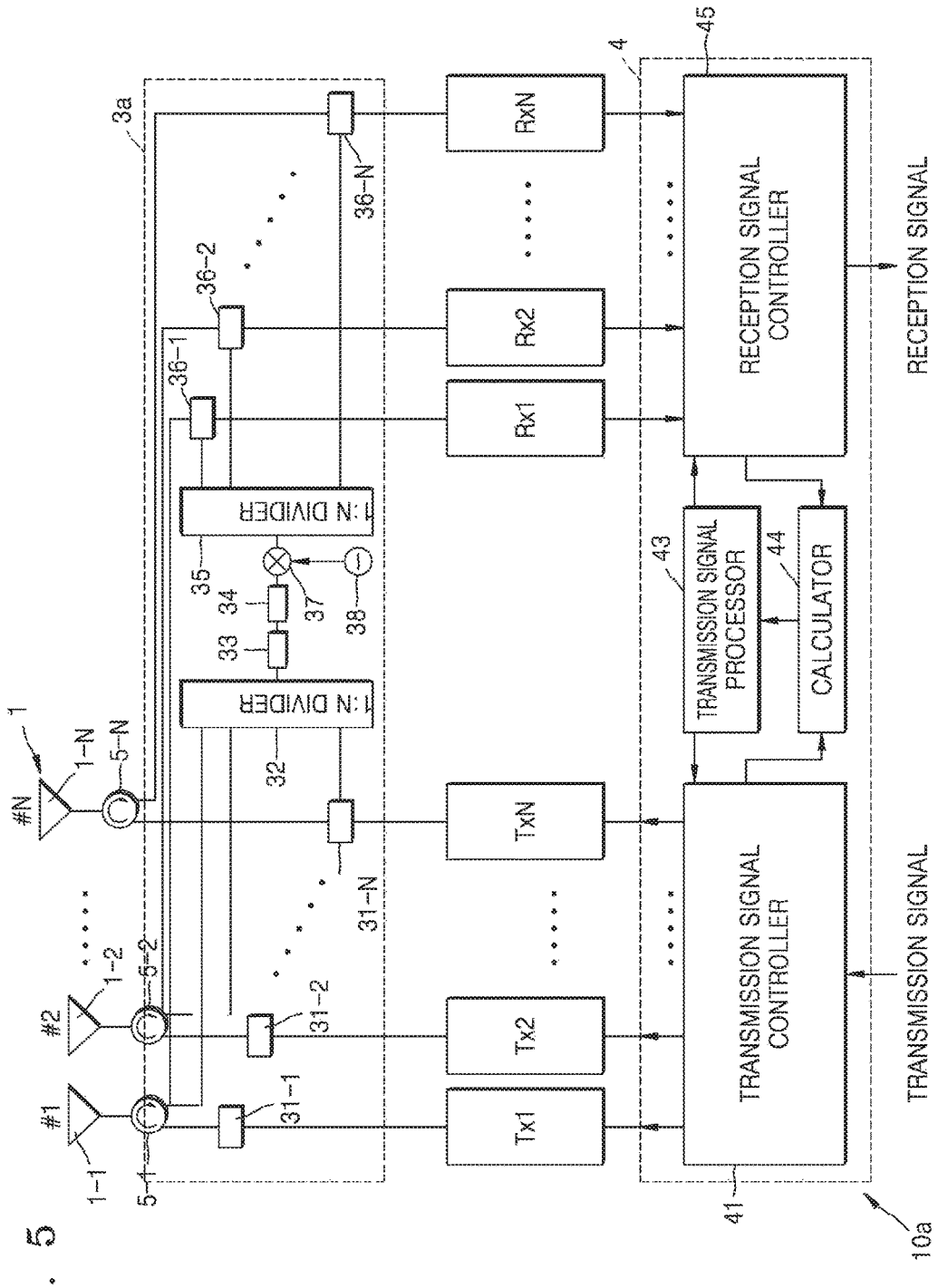
FIG. 5 is a view of a multi-antenna apparatus of a frequency division system for controlling transmission and reception of signals based on channel estimation, according to another embodiment of the present disclosure.

FIG. 5 is a view of a multi-antenna apparatus 10a of a frequency division system for controlling transmission and reception of signals based on channel estimation, according to another embodiment of the present disclosure.

The multi-antenna apparatus 10a of FIG. 5 may perform communication using a frequency division duplex (FDD) system. That is, the multi-antenna apparatus 10a may simultaneously perform transmission and reception of signals using different frequencies.

The multi-antenna apparatus 10a shown in FIG. 5 may include circulators 5-1 to 5-N respectively corresponding to the antenna elements 1-1 to 1-N instead of the TDD switches 2-1 to 2-N included in the multi-antenna apparatus 10 shown in FIG. 1.

Furthermore, in the multi-antenna apparatus 10a of FIG. 5, a signal transferrer 3a (corresponding to the signal transferrer 3 of FIG. 1) may further include a mixer 37 and an oscillator 38. That is, the multi-antenna apparatus 10a of FIG. 5 may include the mixer 37, which mixes an output of a series circuit including the variable attenuator 33 and the ON/OFF switch 34 and an output of the oscillator 38, between the ON/OFF switch 34 and the divider 35. When a frequency of transmission signals of the transmitters Tx1 to TxN is $f_1$ and a frequency of reception signals of the receivers Rx1 to RxN is f2, oscillation frequencies of the oscillator 38 is $f_1$ to $f_2$. Here, the mixer 37 may convert a frequency of an input signal of the frequency $f_1$ to the frequency $f_2$ and output the frequency $f_2$ to the divider 35.

Meanwhile, an embodiment of obtaining a calibration value in the multi-antenna apparatus 10a will be described. A basic operation of the multi-antenna apparatus 10a is the same as that of the multi-antenna apparatus 10 described with reference to FIG. 2.

That is, in operation S1 of FIG. 2, when calculating a calibration value, the multi-antenna apparatus 10a uses a transmission period of a pilot signal for downlink CSI for each antenna element, transmits a predetermined signal from each of the transmitters Tx1 to TxN by time division, and receives a transmission signal by each of the receivers Rx1 to RxN included in a signal receiver through the signal transferrer 3.

Thereafter, in operation S2 of FIG. 2, the calculator 44 calculates a predetermined comparison target value according to the signal transmitted from each of the transmitters Tx1 to TxN and the signal received by each of the receivers Rx1 to RxN, and obtains a calibration value of each branch according to the comparison target value.

If a pilot signal transmitted from each of the transmitters Tx1 to TxN is s(t), a reception signal $x_{k1}$ which is received by the receiver Rxk from the transmitter Tx1 to a reception signal $x_{kN}$ which is received by the receiver Rxk from the transmitter TxN may be represented by Equations (1-1) to (1-N) using the transfer functions $T_1$ to $T_N$ and $R_k$, as shown in Formula 5.

A comparison target value of the multi-antenna apparatus 10a according to Formula 5 may be, e.g., $T_k/T_1$ according to a transfer function of each transmitter and $R_k/R_1$ according to a transfer function of each receiver. Where $T_k$ is a transfer function of a $k^{th}$ transmitter Txk, and $R_k$ is a transfer function of the $k^{th}$ receiver Rxk. Where k=1 to N, and N denotes the number of elements of a multi-antenna. Furthermore, each of the transfer functions $T_k$ and $R_k$ is a complex amplitude and includes a phase component and an amplitude component. The transfer function $T_k$ of the transmitter Txk is a transfer function from the transmitter Txk to the divider 32, and the transfer function $R_k$ of the receiver Rxk is a transfer function from the divider 35 to the receiver Rxk.

If k=1 and k=2 for Equation (1-1), Equation (1-1) is represented by Equations (5) and (6).

[Formula 9]

$$x_{11} = T_1 R_1 s(t) \quad (5)$$

$$x_{21} = T_1 R_2 s(t) \quad (6)$$

Where dividing Equation (6) by Equation (5) yields Equation (7). Equation (7) represents a calibration value of a receiver #2 having a receiver #1 as a reference.

[Formula 10]

$$\frac{x_{21}}{x_{11}} = \frac{T_1 R_2 s(t)}{T_1 R_1 s(t)} = \frac{R_2}{R_1} \quad (7)$$

Similarly, if k=1 and k=3 to N for Equation (1-1), Equation (1-1) is represented by Equations (8) and (9).

[Formula 11]

$$x_{11} = T_1 R_1 s(t) \quad (8)$$

$$x_{k1} = T_1 R_k s(t) \quad (9)$$

Accordingly, a calibration value of a receiver #k having the receiver #1 as a reference may be represented as below.

[Formula 12]

$$\frac{x_{k1}}{x_{11}} = \frac{T_1 R_k s(t)}{T_1 R_1 s(t)} = \frac{R_k}{R_1} \quad (10)$$

Furthermore, if k=1 for Equations (1-1) and (1-2), the following Equations 11 and 12 are obtained.

[Formula 13]

$$x_{11} = T_1 R_1 s(t) \quad (11)$$

$$x_{12} = T_2 R_1 s(t) \quad (12)$$

Where dividing Equation (12) by Equation (11) yields Equation (13). Equation (13) represents a calibration value of a transmitter #2 having a transmitter #1 as a reference.

[Formula 14]

$$\frac{x_{12}}{x_{11}} = \frac{T_2 R_1 s(t)}{T_1 R_1 s(t)} = \frac{T_2}{T_1} \quad (13)$$

Similarly, if k=1 for Equations (1-1) to (1-N), Equations (1-1) to (1-N) is represented by Equations 14 and 15.

[Formula 15]

$$x_{11} = T_1 R_1 s(t) \quad (14)$$

$$x_{1k} = T_k R_1 s(t) \quad (15)$$

Accordingly, a calibration value of a transmitter #k having the transmitter #1 as a reference may be represented as below.

[Formula 16]

$$\frac{x_{1k}}{x_{11}} = \frac{T_k R_1 s(t)}{T_1 R_1 s(t)} = \frac{T_k}{T_1} \quad (16)$$

That is, when the multi-antenna apparatus 10a of FIG. 5 feeds back a transmission signal to a receiving side, the multi-antenna apparatus 10a may transmit the signal using the divider 32 without selecting a corresponding receiver by a switch. Furthermore, since the multi-antenna apparatus 10a of FIG. 5 includes the divider 35 in front of the receiving side, the multi-antenna apparatus 10a may simultaneously obtain transfer functions of all combinations of a transmitter and a receiver. Therefore, all correction values may be obtained by one process.

Furthermore, since the signal transferrer 3a included in the multi-antenna apparatus of FIG. 5 further includes the mixer 37 and the oscillator 38 as compared to the signal transmitter 3 included in the multi-antenna apparatus of FIG. 1, calibration may be realized in signal transmission/reception according to TDD/FDD systems.

Furthermore, it is possible to correct a calibration value when levels of the transmitter and the receiver are different from each other by using a variable attenuator and transmission/reception isolation may be ensured by an ON/OFF switch. The level difference indicates a difference between a voltage range of an amplitude level of a transmission signal of the transmitter and a voltage range of an amplitude level receivable by the receiver. Therefore, when the voltage range of the amplitude level receivable by the receiver is limited to a voltage lower than the voltage range of the amplitude level of the transmission signal of the transmitter, the variable attenuator is used to lower the amplitude level of the transmission signal to within the voltage range of the amplitude level receivable by the receiver.

Furthermore, a comparison target value of the multi-antenna apparatus of FIG. 5 may be, e.g., $T_k/T_1$ according to a transfer function of each transmitter and $R_k/R_1$ according to a transfer function of each receiver.

Figure 6:
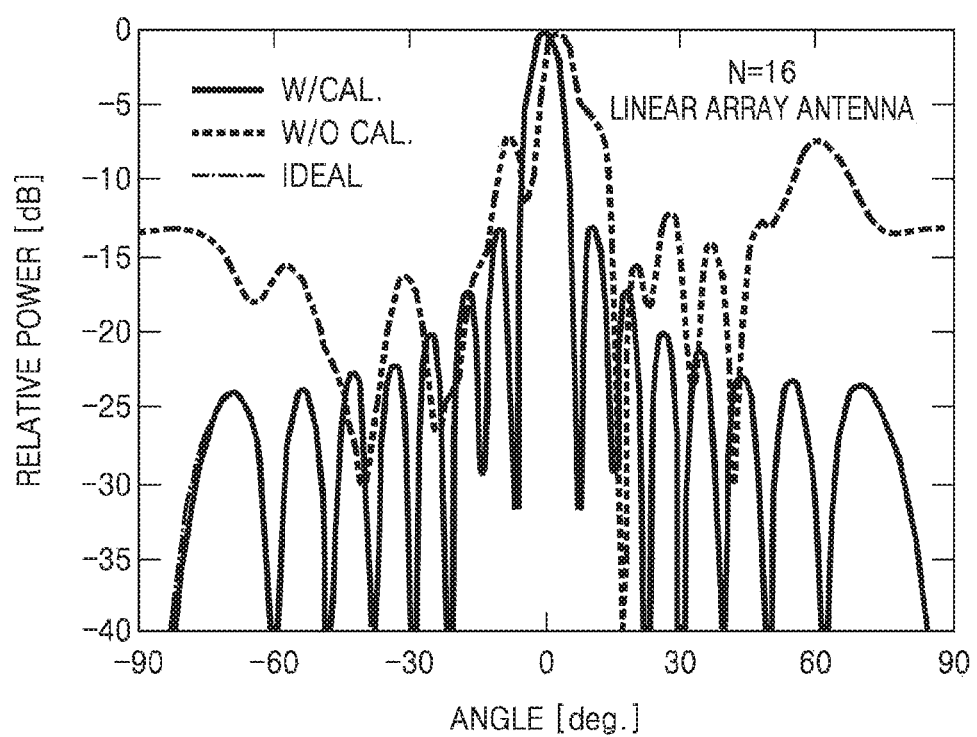
FIG. 6 is a view of radiation patterns of a multi-antenna where a horizontal axis represents an angle and a vertical axis represents relative power.

FIG. 6 is a view of radiation patterns of a multi-antenna where a horizontal axis represents an angle and a vertical axis represents relative power.

FIG. 6 is a graph of experimental results assuming a linear antenna apparatus whose number of antenna elements N is 16 in a multi-antenna apparatus. Referring to FIG. 6, a dashed line indicates a relative power when there is no error in a transmitter. A solid line indicates a relative power when a transmission signal is calibrated according to an embodiment of the present disclosure when there is an error in a transmitter. Furthermore, a broken line indicates a state power when a transmission signal is calibrated and there is an error in a transmitter. According to an embodiment of the present disclosure, it can be seen that a transmission signal is calibrated with relative accuracy, since a solid line is close to the dashed line.

According to some embodiments of the present disclosure, after a predetermined transmission signal s(t) is transmitted from the transmitters Tx1 to TxN, a calibration value is calculated according to a reception signal which is obtained by receiving the transmission signal s(t) by the receivers Rx1 to RxN via the dividers 32 and 35 or the like.

Meanwhile, according to another embodiment of the present disclosure, a calibration value may be obtained using not only a predetermined signal (that is, a transmission signal) but also an arbitrary signal. Therefore, since a calibration value may be obtained by using an arbitrary signal, a calibration value may be obtained even when all transmitters and receivers perform general signal transmission/reception operations.

A multi-antenna apparatus for obtaining a calibration value using an arbitrary signal may be the same as the multi-antenna apparatus 10 of FIG. 1 or the multi-antenna apparatus 10a of FIG. 5. However, processing content of the calculator 44 may be different from that of the multi-antenna apparatuses of FIG. 1 and FIG. 5. Hereinafter, operations of the calculator 44 will be described with reference to FIG. 7.

Figure 7:
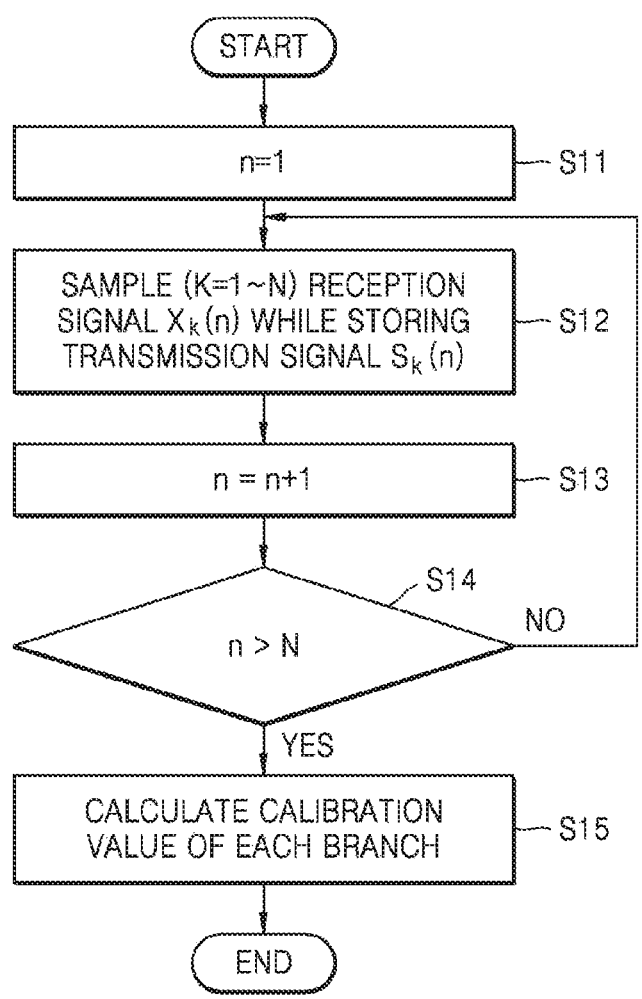
FIG. 7 is a flowchart of a method of controlling transmission and reception of signals based on channel estimation in a multi-antenna apparatus, according to another embodiment of the present disclosure.

FIG. 7 is a flowchart of a method of controlling transmission and reception of signals based on channel estimation in a multi-antenna apparatus, according to another embodiment of the present disclosure.

Referring to FIG. 7, a variable N is the number of antenna elements (i.e., the number of branches) of the multi-antenna 1, and the number of antenna elements is equal to the number of samples of data (the number of sampled data). Furthermore, $T_k$ is a transfer function (complex amplitude) of the $k^{th}$ transmitter Txk. $R_k$ is a transfer function (complex amplitude) of the $k^{th}$ receiver Rxk. $S_k(n)$ is an $n^{th}$ sample of a transmission signal of the $k^{th}$ transmitter Txk, and $x_k(n)$ is an $n^{th}$ sample of a reception signal of the $k^{th}$ receiver Rxk. Furthermore, $T_k/T_1$ is a calibration value of the $k^{th}$ transmitter Txk having a transmitter #1 as a reference, and $R_k/R_1$ is a calibration value of the $k^{th}$ receiver Rxk having the receiver #1 as a reference.

FIG. 7 relates to an embodiment in which the calculator 44 calculates a pair of (i.e., one-time) branch calibration values. Referring to FIG. 7, a calibration value may be calculated using sampled data of a transmission signal and a reception signal transmitted in time series from the number of branches N. In operations S11 to S14, the calculator 44 may sample a reception signal $x_k(n)$ while storing a transmission signal $s_k(n)$ until the number of samples n reaches the number of branches N.

Next, in operation S15, the calculator 44 calculates a calibration value of each branch according to the transmission signal $s_k(n)$ and the reception signal $x_k(n)$ of the number of samples n (operation S15).

According to some embodiments of the present disclosure, it is not necessary to newly obtain data sampled N times every n times when calculating a calibration value. If data is continuously sampled, a calibration value may be calculated using the sampled data of N times in the past.

Hereinafter, an embodiment related to a method of calculating a calibration value will be described.

(A) When the number of antenna elements is two, a reception signal may be represented as follows.

[Formula 17]

$$x_1(1) = (T_1 s_1(1) + T_2 s_2(1)) R_1 \quad (17)$$

$$x_2(1) = (T_1 s_1(1) + T_2 s_2(1)) R_2 \quad (18)$$

$$x_1(2) = (T_1 s_1(2) + T_2 s_2(2)) R_1 \quad (19)$$

$$x_2(2) = (T_1 s_1(2) + T_2 s_2(2)) R_2 \quad (20)$$

Where Equations (17) and (18) are for n=1 (i.e., first sampled data), and Equations (19) and (20) are for n=2 (i.e., second sampled data).

Equation (21) is obtained by representing each of Equations (17) and (19) (or Equations (18) and (20)) using a matrix.

[Formula 18]

$$\begin{pmatrix} s_1(1) & s_2(1) \\ s_1(2) & s_2(2) \end{pmatrix} \begin{pmatrix} R_k T_1 \\ R_k T_2 \end{pmatrix} = \begin{pmatrix} x_k(1) \\ x_k(2) \end{pmatrix} \quad (21)$$

$(k = 1 \text{ or } 2)$

If both sides are multiplied by an inverse matrix of the matrix with s as an element, then Equation (21) becomes Equation (22).

[Formula 19]

$$\begin{pmatrix} R_k T_1 \\ R_k T_2 \end{pmatrix} = \begin{pmatrix} s_1(1) & s_2(1) \\ s_1(2) & s_2(2) \end{pmatrix}^{-1} \begin{pmatrix} x_k(1) \\ x_k(2) \end{pmatrix} \quad (22)$$

$(k = 1 \text{ or } 2)$ s, x are each a transmission signal and a reception signal, and values of respective elements of a matrix of the transmission signal s are different from each other, so that Equation (20) may be derived from Equation (22).

[Formula 20]

$$\frac{R_k T_2}{R_k T_1} = \frac{T_2}{T_1} \quad (23)$$

That is, a calibration value of a transmitter #2 for the transmitter #1 is obtained according to Equation (20). Meanwhile, there are two methods for a receiver.

Method A1: It can be calculated by Equation (20)/Equation (19), that is, by dividing Equation (18) by Equation (17), or by Equation (20)/Equation (19), that is, by dividing Equation (20) by Equation (19).

[Formula 21]

$$\frac{x_2(k)}{x_1(k)} = \frac{(T_1 s_1(k) + T_2 s_2(k)) R_2}{(T_1 s_1(k) + T_2 s_2(k)) R_1} = \frac{R_2}{R_1} \quad (k = 1 \text{ or } 2) \quad (24)$$

That is, a calibration value of the receiver #2 for the receiver #1 is obtained according to Equation (24).

Method A2: in method A1, as a value of N increases, much information needs to be stored in a memory at a time. However, according to this method, a calibration value between receivers may be obtained from a reception signal of another time.

Equations (25) and (26) are obtained by deforming Equations (17) and (20), respectively.

[Formula 22]

$$x_1(1) = T_1 R_1 \left( s_1(1) + \frac{T_2}{T_1} s_2(1) \right) \quad (25)$$

$$x_2(2) = T_1 R_2 \left( s_1(2) + \frac{T_2}{T_1} s_2(2) \right) \quad (26)$$

In a case where $T_2/T_1$, which is a calibration value of a transmitter, has already been calculated, Equation (27) may be obtained from Equations (25) and (26) by calculation.

[Formula 23]

$$P(k) = s_1(k) + \frac{T_2}{T_1} s_2(k) \ (k = 1, 2) \quad (27)$$

That is, Equation (28) is obtained by calculating Equation (26)/Equation (25).

[Formula 24]

$$\frac{x_2(2)}{x_1(1)} = \frac{T_1 R_2 P(2)}{T_1 R_1 P(1)} = \frac{R_2 P(2)}{R_1 P(1)} \quad (28)$$

Equation (29) is obtained by deforming Equation (28).

[Formula 25]

$$\frac{R_2}{R_1} = \frac{x_2(2)}{x_1(1)} \cdot \frac{P(1)}{P(2)} \quad (29)$$

Where x is a reception signal and P can be calculated, so that a value of Equation (29) may be obtained.

(B) When the Number of Antenna Elements is N

B1) Calibration of a Transmitter

In a case of the N element, the reception signal in a $k^{th}$ receiver is as Formula 26.

[Formula 26]

$$x_k(1) = (T_1 s_1(1) + T_2 s_2(1) + \ldots + T_N s_N(1))R_k \quad (30\text{-}1)$$

$$x_k(2) = (T_1 s_1(2) + T_2 s_2(2) + \ldots + T_N s_N(2))R_k \quad (30\text{-}2)$$

$$\vdots = \vdots$$

$$x_k(N) = (T_1 s_1(N) + T_2 s_2(N) + \ldots + T_N s_N(N))R_k \quad (30\text{-N})$$

Where Equation (30-1) is for n=1, Equation (30-1) is for n=2, and the Equations (30-1) is for n=N.

When the above Equation is written in matrix form, Equation (31) is obtained.

[Formula 27]

$$\begin{pmatrix} s_1(1) & s_2(1) & \ldots & s_N(1) \\ s_1(2) & s_2(2) & \ldots & s_N(2) \\ \vdots & \vdots & \ddots & \vdots \\ s_1(N) & s_2(N) & \ldots & s_N(N) \end{pmatrix} \begin{pmatrix} R_k T_1 \\ R_k T_2 \\ \vdots \\ R_k T_N \end{pmatrix} = \begin{pmatrix} x_k(1) \\ x_k(2) \\ \vdots \\ x_k(N) \end{pmatrix} \quad (31)$$

Where, if

[Formula 28]

$$S = \begin{pmatrix} s_1(1) & s_2(1) & \ldots & s_N(1) \\ s_1(2) & s_2(2) & \ldots & s_N(2) \\ \vdots & \vdots & \ddots & \vdots \\ s_1(N) & s_2(N) & \ldots & s_N(N) \end{pmatrix}, t_{R_k} = \begin{pmatrix} R_k T_1 \\ R_k T_2 \\ \vdots \\ R_k T_N \end{pmatrix}, \quad (32)$$

$$x_k = \begin{pmatrix} x_k(1) \\ x_k(2) \\ \vdots \\ x_k(N) \end{pmatrix},$$

Equation (33) may be calculated.

[Formula 29]

$$St_{R_k} = x_k \Rightarrow t_{R_k} = S^{-1} x_k \quad (33)$$

Equation (34) may be obtained by using an element of $t_{R_k}$.

[Formula 30]

$$\frac{R_k T_j}{R_k T_1} = \frac{T_j}{T_1} \quad (j = 2\sim N) \quad (34)$$

B2) Calibration of a Receiver (Method 1)

In a case of an N element, a reception signal at each receiver in an $n^{th}$ sample is as Formula 31.

[Formula 31]

$$x_1(n) = (T_1 s_1(n) + T_2 s_2(n) + \ldots + T_N s_N(n))R_1 \quad (35\text{-}1)$$

$$x_2(n) = (T_1 s_1(n) + T_2 s_2(n) + \ldots + T_N s_N(n))R_2 \quad (35\text{-}2)$$

$$\vdots = \vdots$$

$$x_N(n) = (T_1 s_1(n) + T_2 s_2(n) + \ldots + T_N s_N(n))R_N \quad (35\text{-N})$$

Where terms of $(T_1 s_1(n)+T_2 s_2(n)+ \ldots +T_N s_N(n))$ are identical. A calibration value of the receiver may be obtained from the following calculation.

[Formula 32]

$$\frac{x_k(n)}{x_1(n)} = \frac{(T_1 s_1(n) + T_2 s_2(n) + \ldots + T_N s_N(n))R_k}{(T_1 s_1(n) + T_2 s_2(n) + \ldots + T_N s_N(n))R_1} \quad (36)$$

$$= \frac{R_k}{R_1} \quad (k = 1\sim N)$$

B3) Calibration of a Receiver (Method 2)

A reception signal at a $k^{th}$ sample of a $k^{th}$ receiver is as Formula 33.

[Formula 33]

$$x_k(k) = T_1 R_k \left( s_1(k) + \frac{T_2}{T_1} s_2(k) + \ldots + \frac{T_N}{T_1} s_N(k) \right) \quad (37)$$

$$= T_1 R_k \sum_{j=1}^{N} \left( \frac{T_j}{T_1} s_j(k) \right)$$

Where P(k) in Equation (38) may be calculated if a calibration value of a transmitter is obtained.

[Formula 34]

$$P(k) = \sum_{j=1}^{N} \left( \frac{T_j}{T_1} s_j(k) \right) \quad (38)$$

Furthermore, a calibration value of the receiver may be obtained by Equation (40) from calculation of Equation (39).

[Formula 35]

$$\frac{x_k(k)}{x_1(1)} = \frac{T_1 R_k P(k)}{T_1 R_1 P(1)} = \frac{R_k P(k)}{R_1 P(1)} \quad (39)$$

[Formula 36]

$$\frac{R_k}{R_1} = \frac{x_k(k)}{x_1(1)} \cdot \frac{P(1)}{P(k)} \quad (40)$$

That is, since a calibration value may be obtained from an arbitrary signal in addition to a predetermined signal, the calibration value may be obtained even when all transceivers operate.

Furthermore, when a multi-antenna apparatus performs transmission and reception of signals simultaneously with the FDD system according to some embodiments of the present disclosure and when a signal other than a transmission signal through the signal transferrer 3 or 3a is included in a reception signal, the above-mentioned calibration value may be calculated after removing the signal other than the transmission signal by removing general interference. For example, a signal having a high degree of correlation with an existing transmission signal may be extracted using an adaptive filter, thereby extracting a transmission signal through the signal transferrer 3 or 3a. In addition, when the transmission signal is fed back through the signal transferrer 3 or 3a during data communication, data signal may be extracted from a reception signal by removing a signal having a high degree of correlation with the transmission signal.

Meanwhile, according to some embodiments of the present disclosure, the variable attenuator 33 or the ON/OFF switch 34 may be omitted, or it is possible to configure the divider 32 or 35 of 1 to N by combining a plurality of dividers of M to 1 (where M is smaller than N) or to change to integrate or divide each block in the controller 4.

Figure 12:
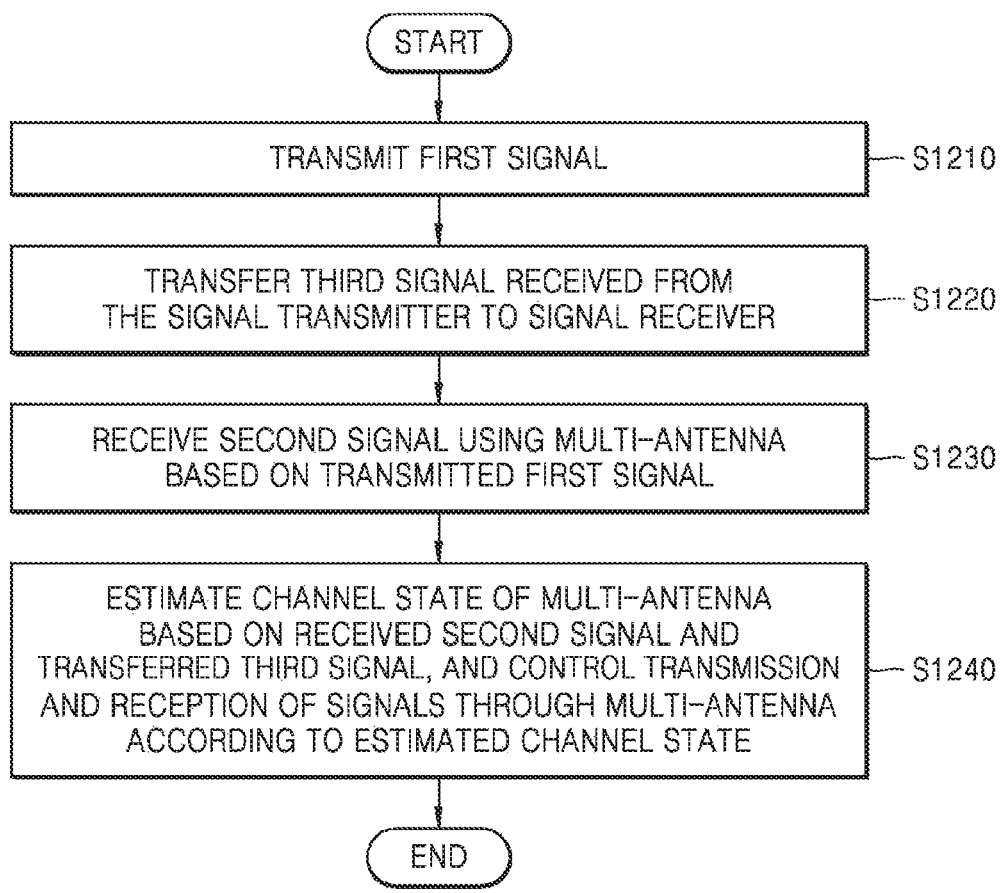
FIG. 12 is a flowchart for explaining a method of controlling transmission and reception of signals based on channel estimation, according to some embodiments of the present disclosure.

FIG. 12 is a flowchart for explaining a method of controlling transmission and reception of signals based on channel estimation, according to some embodiments of the present disclosure.

In operation S1210, a signal transmitter of a multi-antenna apparatus may transmit a first signal.

In operation S1220, a third signal received from a signal transmitter may be transferred to a signal receiver. That is, the first signal and the third signal are signals input to a multi-antenna and a signal transferrer by the signal transmitter, respectively, and signal content may be identical. Here, the signal transmitter may correct a power intensity of the multi-antenna using different power intensities for different antennas when transmitting and receiving the third signal. Also, the first signal may be a downlink pilot signal, but is not limited thereto.

In operation S1230, the signal receiver may receive a second signal using the multi-antenna based on the transmitted first signal. The second signal may be a signal that has received the first signal transmitted by the signal transmitter.

In operation S1240, a calculator may estimate a channel state of the multi-antenna based on the received second signal and the transferred third signal, and the multi-antenna apparatus may control transmission and reception of signals through the multi-antenna according to the estimated channel state.

Furthermore, the multi-antenna apparatus may further include calculating a calibration value of the multi-antenna based on the estimated channel state of the multi-antenna. In more detail, the calibration value is defined as a ratio of a comparison target value determined based on respective transfer functions of the third signal and a second signal of a first antenna among the multi-antenna to a comparison target value of a second antenna among the multi-antenna. Here, the number of times the second signal is sampled may be equal to the number of antennas of the multi-antenna and the calibration value of the multi-antenna may be calculated by storing the third signal by the number of times of sampling. Furthermore, when a calibration value of the first signal is calculated, a calibration value of the second signal may be calculated by using the second signal received at an arbitrary time.

Meanwhile, the comparison target value may be a ratio of a transfer function of the second signal of the first antenna to a transfer function of the third signal of the first antenna. Also, the comparison target value may be a ratio of the transfer function of the third signal or the second signal of the first antenna to a transfer function of a third signal or a second signal of the second antenna, but is not limited thereto.

On the other hand, the multi-antenna apparatus may further control amplitude and phase of the first signal based on the estimated channel state.

Figure 13:
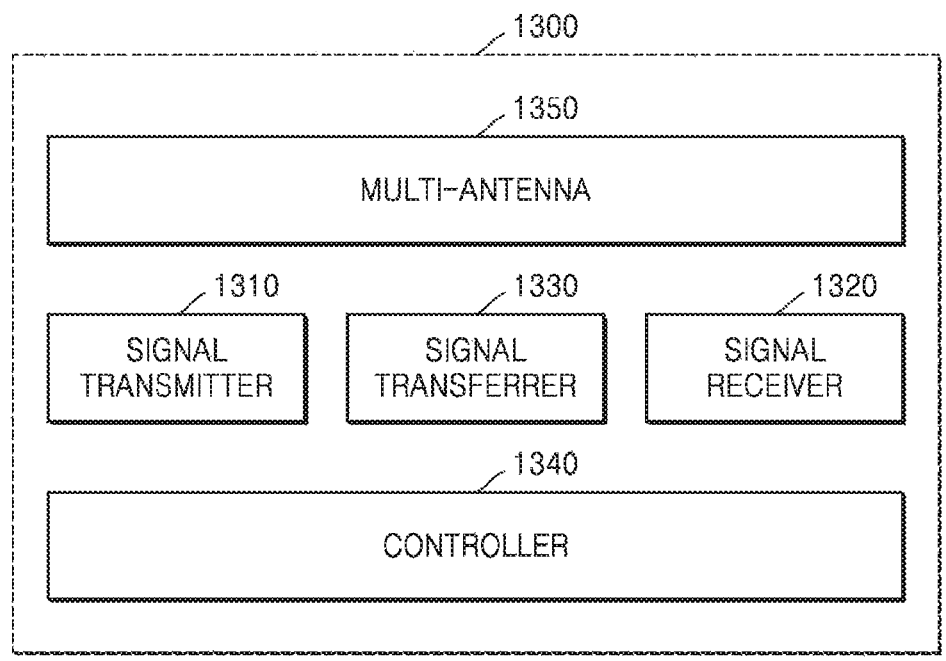
FIG. 13 is a block diagram for explaining a multi-antenna apparatus for controlling transmission and reception of signals based on channel estimation, according to some embodiments of the present disclosure.

FIG. 13 is a block diagram for explaining the multi-antenna apparatus 10 for controlling transmission and reception of signals based on channel estimation, according to some embodiments of the present disclosure.

Referring to FIG. 13, the multi-antenna apparatus 10 may include a signal transmitter 1310, a signal receiver 1320, a signal transferrer 1330, a controller 1340, and a multi-antenna 1350. Only components related to embodiments are shown in the multi-antenna apparatus 10 of FIG. 13. Accordingly, it will be understood by those skilled in the art that other general-purpose elements may be further included in addition to the elements shown in FIG. 13.

The signal transmitter 1310 may transmit a first signal using the multi-antenna 1350. The first signal may be a downlink pilot signal, but is not limited thereto.

The signal receiver 1320 may receive a second signal using the multi-antenna 1350 based on the transmitted first signal.

The signal transferrer 1330 may receive a third signal input to the signal transmitter 1310 and provide a third signal to the signal receiver.

The controller 1340 may estimate a channel state of the multi-antenna 1350 based on the second signal and the third signal obtained from the signal receiver and may control transmission and reception of signals through the multi-antenna 1350 according to the estimated channel state.

The multi-antenna 1350, which includes a plurality of transmitting antennas and receiving antennas, may include, but is not limited to, linear or non-linear antennas.

Figure 14:
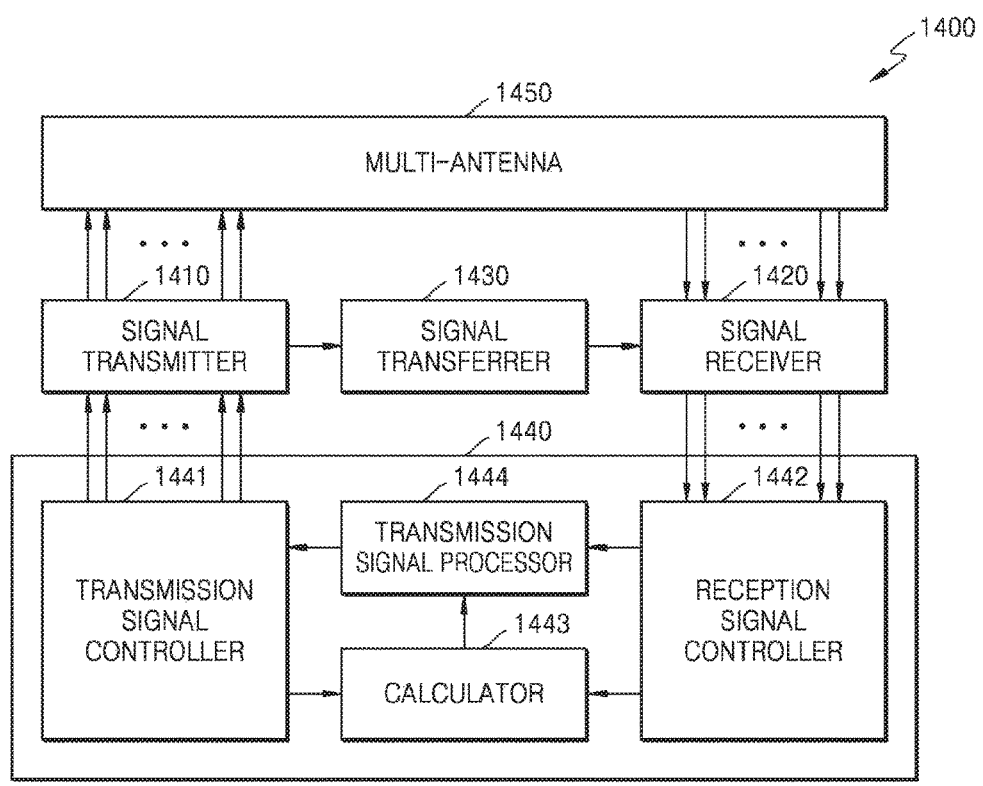
FIG. 14 is a detailed block diagram for explaining a multi-antenna apparatus for controlling transmission and reception of signals based on channel estimation, according to some embodiments of the present disclosure.

FIG. 14 is a detailed block diagram for explaining the multi-antenna apparatus 10 for controlling transmission and reception of signals based on channel estimation, according to some embodiments of the present disclosure.

A controller 1440 may include a transmission signal controller 1441, a reception signal controller 1442, a transmission signal processor 1444, and a calculator 1443. Only components related to embodiments are shown in the multi-antenna apparatus 10 of FIG. 14. Accordingly, it will be understood by those skilled in the art that other general-purpose elements may be further included in addition to the elements shown in FIG. 14.

The transmission signal controller 1441 may distribute a transmission signal to a plurality of transmission signals, adjust an intensity of the plurality of transmission signals, and transmit the transmission signals to a signal transmitter 1430 for transmitting the transmission signal through a multi-antenna 1450.

The reception signal controller 1442 may adjust intensities of a plurality of reception signals received through the multi-antenna 1450 and may synthesize the plurality of reception signals into one reception signal.

The calculator 1443 may calculate a calibration value of the multi-antenna based on a channel state. Here, the calibration value may be calculated based on a ratio of a comparison target value determined based on respective transfer functions of a second signal and third signal of a first antenna among the multi-antenna to a comparison target value of a second antenna among the multi-antenna 1450. Meanwhile, the comparison target value may be a ratio of the transfer function of the second signal of the first antenna to the transfer function of the third signal of the first antenna.

Furthermore, the comparison target value may be determined by, but is not limited to, the ratio of the transfer function of the second signal of the first antenna to the transfer function of the third signal of the first antenna.

Meanwhile, the calculator 1443 may sample the second signal equal to the number of antennas of the multi-antenna 1450 and may calculate the calibration value of the multi-antenna 1450 by storing the third signal by the number of times the second signal is sampled. Furthermore, when a calibration value of the first signal is calculated, the calculator 1443 may calculate a calibration value of the second signal by using the second signal received at an arbitrary time.

The transmission signal processor 1444 may control amplitude and phase of the first signal input to a signal transmitter 1410 based on a channel state.

The signal transmitter 1430 may include a variable attenuator (not shown) that corrects a power intensity of the multi-antenna 1450 using different power intensities for different antennas when transmitting and receiving signals. Furthermore, the signal transmitter 1430 may include an oscillator (not shown) for generating an electrical vibration and a mixer (not shown) for mixing an output signal of the variable attenuator and an output signal of the oscillator.

The present disclosure may be embodied as computer readable code/instructions on a recording medium, e.g., a program module to be executed in computers, the program module including computer-readable commands. The computer readable medium may be any usable medium that may be accessed by a computer, and may include any usable medium, such as, a volatile and non-volatile medium and a discrete type and non-discrete type medium. Also, the computer readable medium may include all computer storing media and communication media. The computer storing medium may include any medium, such as, a volatile and non-volatile medium and a discrete type and non-discrete type medium that is realized by a method or technique for storing information, such as, a computer readable command, a data structure, a program module, or other data. The communication medium may include other data of modulated signal, such as, a computer readable command, a data structure, a program module, or a carrier signal, or other transmission mechanism, and an arbitrary information medium.

Therefore, the scopes of the present embodiments are defined not by the detailed description but by the appended claims, and all differences within the scope will be construed as being included in the present embodiments.

The invention claimed is:

1. A multi-antenna apparatus for controlling transmission and reception of signals based on channel estimation, the multi-antenna apparatus comprising:
   a signal transmitter configured to transmit a first signal using a multi-antenna;
   a signal receiver configured to receive a second signal using the multi-antenna based on the transmitted first signal;
   a signal transferrer configured to receive a third signal received from the signal transmitter and provide the third signal to the signal receiver; and
   a controller configured to estimate a channel state of the multi-antenna based on the second signal and the third signal obtained from the signal receiver, and control transmission and reception of the signals through the multi-antenna according to the estimated channel state.

2. The multi-antenna apparatus of claim 1, wherein
   the controller includes a calculator configured to calculate a calibration value of the multi-antenna based on the channel state, and
   the calibration value is calculated based on a ratio of a comparison target value determined based on respective transfer functions of the second signal and the third signal of a first antenna among the multi-antenna to a comparison target value of a second antenna among the multi-antenna.

3. The multi-antenna apparatus of claim 2, wherein the comparison target value is determined by a ratio of the transfer function of the second signal of the first antenna to the transfer function of the third signal of the first antenna.

4. The multi-antenna apparatus of claim 2, wherein the comparison target value is determined by a ratio of the transfer function of the second signal or the third signal of the first antenna to a transfer function of the third signal or the second signal of the second antenna.

5. The multi-antenna apparatus of claim 1, wherein the controller includes a transmission signal processor configured to control amplitude and phase of the first signal input to the signal transmitter based on the channel state.

6. The multi-antenna apparatus of claim 1, wherein the signal transmitter includes a variable attenuator configured to correct a power intensity of the multi-antenna using different power intensities for different antennas when transmitting and receiving the signals.

7. The multi-antenna apparatus of claim 6, wherein the signal transmitter includes:
   an oscillator configured to generate an electrical vibration; and
   a mixer configured to mix an output signal of the variable attenuator and an output signal of the oscillator.

8. The multi-antenna apparatus of claim 1, wherein the controller includes:
   a transmission signal controller configured to distribute a transmission signal to a plurality of transmission signals, to adjust intensities of the plurality of transmission signals, and to transmit the transmission signals to the signal transmitter for transmitting the transmission signal through the multi-antenna; and
   a reception signal controller configured to adjust intensities of a plurality of reception signals received through the multi-antenna and synthesize the plurality of reception signals into one reception signal.

9. The multi-antenna apparatus of claim 1, wherein the first signal is a downlink pilot signal.

10. The multi-antenna apparatus of claim 2, wherein
    a number of times the second signal is sampled by the calculator is equal to a number of antennas of the multi-antenna, and
    the calculator is configured to calculate the calibration value of the multi-antenna by storing the third signal by the number of times the second signal is sampled.

11. The multi-antenna apparatus of claim 2, wherein, when a calibration value of the first signal is calculated, the calculator is configured to calculate a calibration value of the second signal by using the second signal received at an arbitrary time.

12. A method of controlling transmission and reception of signals based on channel estimation in a multi-antenna apparatus, the method comprising:
    transmitting a first signal from a signal transmitter;
    transferring a third signal received from the signal transmitter to a signal receiver;
    receiving a second signal using the multi-antenna based on the transmitted first signal; and estimating a channel state of the multi-antenna based on the received second signal and the transferred third signal, and controlling transmission and reception of the signals through the multi-antenna according to the estimated channel state.

13. The method of claim 12, further comprising:
calculating a calibration value of the multi-antenna based on the estimated channel state of the multi-antenna, and wherein
the calibration value is defined as a ratio of a comparison target value determined based on respective transfer functions of the second signal and the third signal of a first antenna among the multi-antenna to a comparison target value of a second antenna among the multi-antenna.

14. The method of claim 13, wherein the comparison target value is a ratio of a transfer function of the second signal of the first antenna to a transfer function of the third signal of the first antenna.

15. The method of claim 13, wherein the comparison target value is a ratio of the transfer function of the second signal or the third signal of the first antenna to a transfer function of the third signal or the second signal of the second antenna.

16. The method of claim 12, further comprising:
controlling amplitude and phase of the first signal based on the estimated channel state.

17. The method of claim 12, wherein the transferring of the third signal to the signal receiver comprises:
correcting a power intensity of the multi-antenna using different power intensities for different antennas when transmitting and receiving the third signal.

18. The method of claim 13, wherein
a number of times the second signal is sampled is equal to a number of antennas of the multi-antenna, and
the method comprises calculating the calibration value of the multi-antenna by storing the third signal by the number of times the second signal is sampled.

19. The method of claim 13, wherein, when a calibration value of the first signal is calculated, a calibration value of the second signal is calculated by using the second signal received at an arbitrary time.

20. A non-transitory computer-readable recording medium having recorded thereon a program for executing the method of claim 12.

* * * * *